United States Patent
Wiemker et al.

(10) Patent No.: US 9,424,641 B2
(45) Date of Patent: Aug. 23, 2016

(54) VISUAL SUPPRESSION OF SELECTIVE TISSUE IN IMAGE DATA

(71) Applicant: KONINKLIJE PHILIPS N.V., Eindhoven (NL)

(72) Inventors: Rafael Wiemker, Kisdore (DE); Thomas Buelow, Grosshansdorf (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/388,008

(22) PCT Filed: Mar. 22, 2013

(86) PCT No.: PCT/IB2013/052276
§ 371 (c)(1),
(2) Date: Sep. 25, 2014

(87) PCT Pub. No.: WO2013/144794
PCT Pub. Date: Oct. 3, 2013

(65) Prior Publication Data
US 2015/0063669 A1 Mar. 5, 2015

Related U.S. Application Data

(60) Provisional application No. 61/617,391, filed on Mar. 29, 2012.

(51) Int. Cl.
*G06K 9/00* (2006.01)
*G06T 7/00* (2006.01)
(Continued)

(52) U.S. Cl.
CPC ............... *G06T 7/0012* (2013.01); *G06T 11/00* (2013.01); *G06T 15/08* (2013.01); *G06T 2210/32* (2013.01); *G06T 2210/41* (2013.01); *G06T 2210/62* (2013.01)

(58) Field of Classification Search
CPC ... G06T 7/0012; G06T 11/003; G06T 11/006; G06T 11/008; G06T 15/08; G06T 2210/32; G06T 2210/62; G06T 2210/41; G06T 2207/30096; G06T 2207/30101; A61B 6/504
See application file for complete search history.

(56) References Cited

U.S. PATENT DOCUMENTS 6,937,776 B2   8/2005   Li et al.
8,050,481 B2   11/2011  Reeves et al.
(Continued)

FOREIGN PATENT DOCUMENTS

WO   2006085250 A2   8/2006
WO   2010143100 A1   12/2010

OTHER PUBLICATIONS

Hahn et al., "Visualization and interation techniques for the exploratino of vascular structures", Oct. 26, 2001, IEEE, Proceedings Visualization, 2001, p. 395-402.*

(Continued)

*Primary Examiner* — Stephen R Koziol
*Assistant Examiner* — Timothy Choi (57) ABSTRACT

A method image data processor (318) includes a shape likelihood determiner (402) that processes voxels of image data and determines a likelihood that a voxel represents predetermined tissue of interest for a plurality of the voxels based on a shape of a tissue represented by the voxel, an opacity determiner (406) that determines an opacity suppression for each of the plurality of voxels based on the likelihood, a re-formatter (410) that re-formats the image data based on the determined opacity suppression, generating opacity suppressed re-formatted data, and a rendering engine (412) that visually presents the opacity suppressed re-formatted data.

20 Claims, 6 Drawing Sheets

(51) Int. Cl.
*G06T 15/08* (2011.01)
*G06T 11/00* (2006.01)

(56) References Cited

U.S. PATENT DOCUMENTS

| 8,126,229 B2 | 2/2012 | Ghanem et al. |
| 2007/0165920 A1* | 7/2007 | Gering .................. A61B 5/055 382/128 |
| 2009/0252395 A1 | 10/2009 | Chan et al. |

OTHER PUBLICATIONS

Silverstein et al., "Automatic perceptual color map generation for realistic volumne visualization", Mar. 13, 2008, Elsevier, Journal of Biomedical Informatics, 41, p. 927-935.*

Agam et al: "Vessel Tree Reconstruction in Thoracic CT Scans With Application to Nodule Detection"; IEEE Transactions on Medical Imaging, vol. 24, No. 4, Apr. 2005, pp. 486-499.

Barillot:"Surface and Volume Rendering Techniques to Display 3-D Data"; IEEE Engineering in Medicine and Biology, Mar. 1993, pp. 111-119.

Frangi et al: "Multiscale Vessel Enhancement Filtering"; Medical Image Computing and Computer-Assisted Intervention, MICCAI'98, Lecture Notes in Computer Science, vol. 1496, pp. 130-137.

Kniss et al: "Multidimensional Transfer Functions for Interactive Volume Rendering"; IEEE Transaction on Visualization and Computer Graphics, vol. 8, No. 3, Jul.-Sep. 2002, pp. 270-285.

Li et al: "Selective Enhancement Filters for Nodules, Vessels, and Airway Walls in Two-and Three-Dimensional CT Scans"; Med. Phys. 30 (8), Aug. 2003, pp. 2040-2051.

Lorenz et al: Multi-Scale Line Segmentation With Automatic Estimation of Width, Contrast and Tangential Direction in 2D and 3D Medical Images; First Joint Conference on Computer Vision, Virtual Reality and Robotics in Medicine, and Medicalrobotics and Computer-Assisted Surgery, 1997, pp. 233-242.

Sato et al: "Tissue Classification Based on 3D Local Intensity Structures for Volume Rendering"; IEEE Transactions on Visualization and Computer Graphics, vol. 6, No. 2, Apr.-Jun. 2000, pp. 160-180.

Wiemker et al: "Filter Learning and Evaluation of the Computer Aided Visualization and Analysis (CAVA) Paradigm for Pulmonary Nodules Using the LIDC-IDRI Database"; Proceedings of SPIE, vol. 7624, Jan. 2010, pp. 76272U-1-76242U-12.

* cited by examiner

VISUAL SUPPRESSION OF SELECTIVE TISSUE IN IMAGE DATA

CROSS-REFERENCE TO PRIOR APPLICATIONS

This application is the U.S. National Phase application under 35 U.S.C. §371 of International Application No. PCT/IB2013/052276, filed on Mar. 22, 2013, which claims the benefit of U.S. Provisional Patent Application No. 61/617391, filed on Mar. 29, 2012. These applications are hereby incorporated by reference herein.

The following generally relates to image data processing and more particularly to visually suppressing selective tissue in image data, and is described with particular application to computed tomography (CT). However, the following is also amenable to other imaging modalities such as magnetic resonance imaging (MRI), digital radiography, and/or other imaging modality.

A CT scanner includes an x-ray tube supported by a rotating frame. The rotating frame and hence the x-ray tube rotate around an examination region, and the x-ray tube emits radiation that traverses the examination region. A radiation sensitive detector is located opposite the x-ray tube, across the examination region, and detects radiation that traverses the examination region. The radiation sensitive detector generates projection data indicative of the detected radiation. A reconstructor reconstructs the projection data and generates volumetric image data. An image processor can be used to process the volumetric image data and generate one or more images.

CT (and other imaging) has been used to visually appraise tissue such as nodules and lymph nodes. Visual appraisal of nodules and lymph nodes is standard clinical task for tumor detection, staging and therapy monitoring. Unfortunately, nodules and/or nodes are often visually obscured, for example, by surrounding vessels, due to their similar appearance and visual occlusion thereby. As a consequence, in the context of a lung study, for example, a high portion of central or other lung nodules may be overlooked during visual appraisal, for example, due to their similar appearance and occlusion of surrounding lung vasculature.

Figure 1:
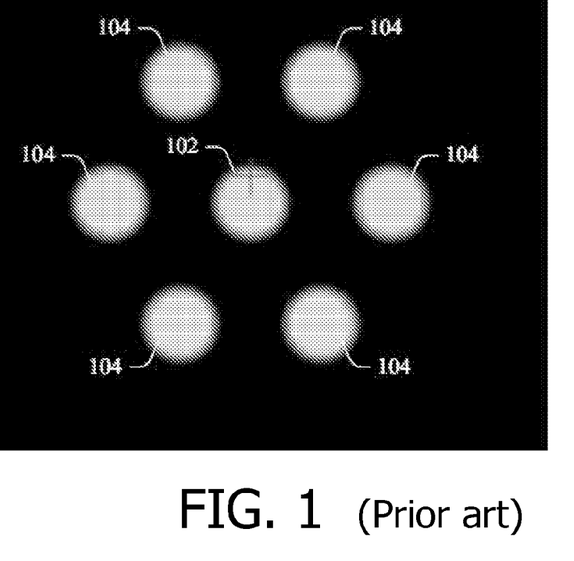
FIG. 1 shows a prior art image of a cross-section of simulated vessels and a nodule in which the nodule and the vessels have approximately a same cross-sectional shape and intensity and thus are not readily visually distinguishable.
Figure 2:
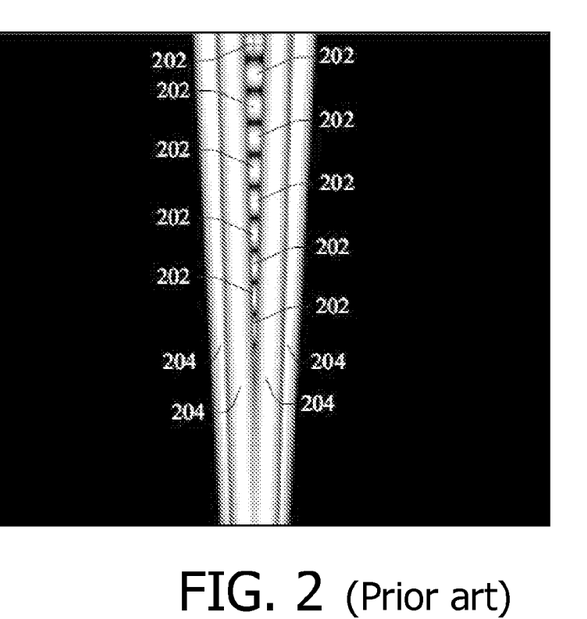
FIG. 2 shows a prior art image of simulated vessels and nodules in which the vessels visually obscure visualization of the nodules.

An example of this is shown in connection with FIG. 1, in which a simulated nodule 102 has approximately a same cross sectional shape as simulated vessels 104, which surround the simulated nodule 102. In this example, the simulated nodule 102 might be confused as a simulated vessel 104, and vice versa. Another example is shown in connection with FIG. 2, in which simulated nodules 202 are fully to partially visually occluded by simulated vessels 204, which surround the simulated nodules 202. In this example, the simulated vessels 204 visually occlude the nodules 202.

Computer Aided Detection (CAD) software has been used to automatically differentiate between nodules and surrounding vessels. Generally, this includes classifying groups of voxels as either nodule or vessel based on shape (e.g., tubular versus blob shaped) and making a binary decision (nodule or vessel). Visual markers such as arrows, circles, etc. are then superimposed over a (conventional or slab) maximum intensity projection (MIP) or other rendering (e.g., direct volume rendering (DVR), digitally reconstructed radiograph (DRR), etc.) to identify nodules. Unfortunately, such binary classification by CAD systems also produce false positives and false negatives, and the overlayed markers may clutter the image in a distracting manner.

Aspects described herein address the above-referenced problems and others.

In one aspect, an image data processor includes a shape likelihood determiner that processes voxels of image data and determines a likelihood that a voxel represents predetermined tissue of interest for a plurality of the voxels based on a shape of a tissue represented by the voxel. The image data processor further includes an opacity determiner that determines an opacity suppression for each of the plurality of voxels based on the likelihood. The image data processor further includes a re-formatter that re-formats the image data based on the determined opacity suppression, generating opacity suppressed re-formatted data. The image data processor further includes a rendering engine that visually presents the opacity suppressed re-formatted data.

In another aspect, a method includes determining a likelihood that each of a plurality of voxels of image data represents predetermined tissue of interest based on a shape of a tissue represented by the voxel. The method further includes obtaining a likelihood to opacity mapping. The method further includes re-formatting the image data based on the likelihood and the likelihood to opacity mapping, generating opacity suppressed formatted data. The method further includes displaying the opacity suppressed re-formatted data.

In another aspect, a computer readable storage medium is encoded with computer readable instructions. The computer readable instructions, when executed by a processer, causes the processor to determine a likelihood that each of a plurality of voxels of image data represents predetermined tissue of interest based on a shape of a tissue represented by the voxel, obtain a likelihood to opacity mapping, re-format the image data based on the likelihood and the likelihood to opacity mapping, generating opacity suppressed formatted data, and display the opacity suppressed re-formatted data.

The invention may take form in various components and arrangements of components, and in various steps and arrangements of steps. The drawings are only for purposes of illustrating the preferred embodiments and are not to be construed as limiting the invention.

Figure 3:
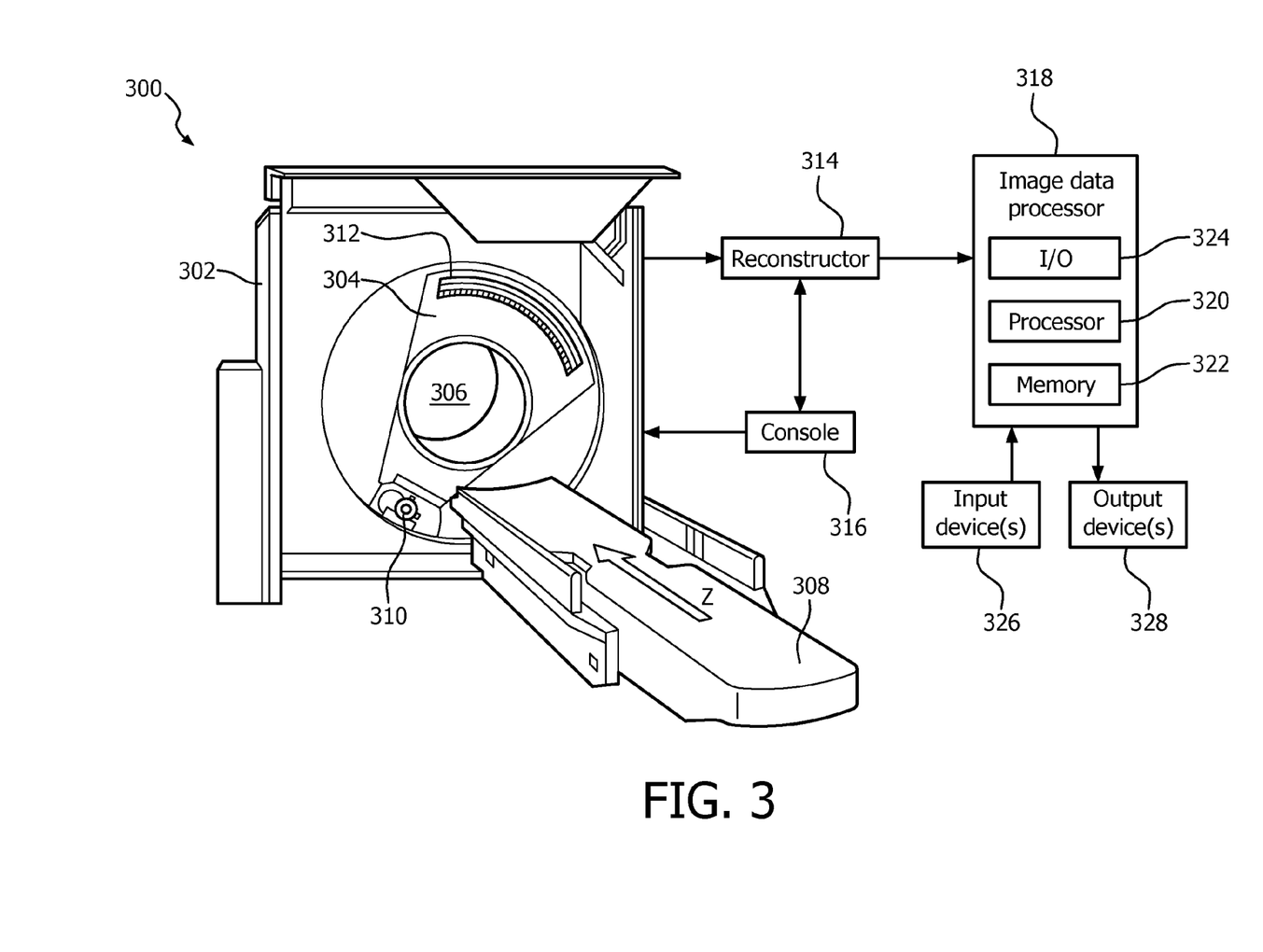
FIG. 3 schematically illustrates an imaging system in connection with an image data processor that visually presents processed image data in a manner in which an opacity of voxels representing predetermined tissue is variable optically suppressed based on a likelihood that the voxels represent the predetermined tissue.

Initially referring to FIG. 3, an imaging system 300 such as a CT scanner is illustrated. The imaging system 300 includes a generally stationary gantry 302 and a rotating gantry 304, which is rotatably supported by the stationary gantry 302 and rotates around an examination region 306 about a z-axis. A subject support 308, such as a couch, supports an object or subject in the examination region 306.

A radiation source 310, such as an x-ray tube, is rotatably supported by the rotating gantry 304, rotates with the rotating gantry 304, and emits radiation that traverses the examination region 306. A radiation sensitive detector array 312 subtends an angular arc opposite the radiation source 310 across the examination region 306. The radiation sensitive detector array 312 detects radiation traversing the examination region 306 and generates a signal indicative thereof for each detected photon.

A reconstructor 314 reconstructs the projection, generating volumetric image data indicative of a scanned portion of a subject or object located in the imaging region 306. A general-purpose computing system or computer serves as an operator console 316. The console 316 includes a human readable output device such as a monitor and an input device such as a keyboard, mouse, etc. Software resident on the console 316 allows the operator to interact with and/or operate the scanner 300 via a graphical user interface (GUI) or otherwise.

An image data processor 318 includes at least one processor 320 that executes at least one computer readable instruction stored in computer readable storage medium, such as physical memory 322 or other non-transitory storage medium. The processor 320 may also executes one or more computer readable instructions carried by a carrier wave, a signal or other transitory medium. Input/output (I/O) 324 is configured to receive information from one or more input devices 326 (e.g., a keyboard, a mouse, etc.) and/or convey information (e.g., a Graphical User Interface (GUI) and information therein in display regions) to one or more output devices 328 (e.g., a monitor, a filmer, portable memory, etc.).

The image data processor 318, based on at least one instruction, processes voxels of image data from the imaging system 300 and/or other imaging system and visually presents the processed image data via the one or more output devices 328. As described in greater detail below, such processing includes identifying a likelihood that a voxel represents a predetermined type of tissue and suppressing an opacity of the voxel based on the likelihood. Such suppression is gradual in that it is not a binary suppression of no suppression or full suppression, but rather a degree of suppression that is based on the likelihood. For example, voxels identified as representing the predetermined type of tissue but with different likelihoods will be suppressed to different degrees.

By way of example, a goal of a lung study may be to visually observe nodules, fissures, tumors, and/or other tissue of interest in connection with the lung tissue. However, vasculature (e.g., vessels) may inhibit or obscure such observation. The image data processor 318 can process the image data of the lungs such that the opacity of the voxels representing the vasculature is visually suppressed, with the suppression applied to a voxel corresponding to a probability that that voxel represents vasculature. As such, a voxel with a higher probability of being vasculature is visually suppressed to a greater degree than a voxel with a lower probability of being vasculature. Non-lung studies are also contemplated herein. For example, the tissue of interest could be a liver tumor and the tissue to suppress could be hepatic vasculature.

Figure 4:
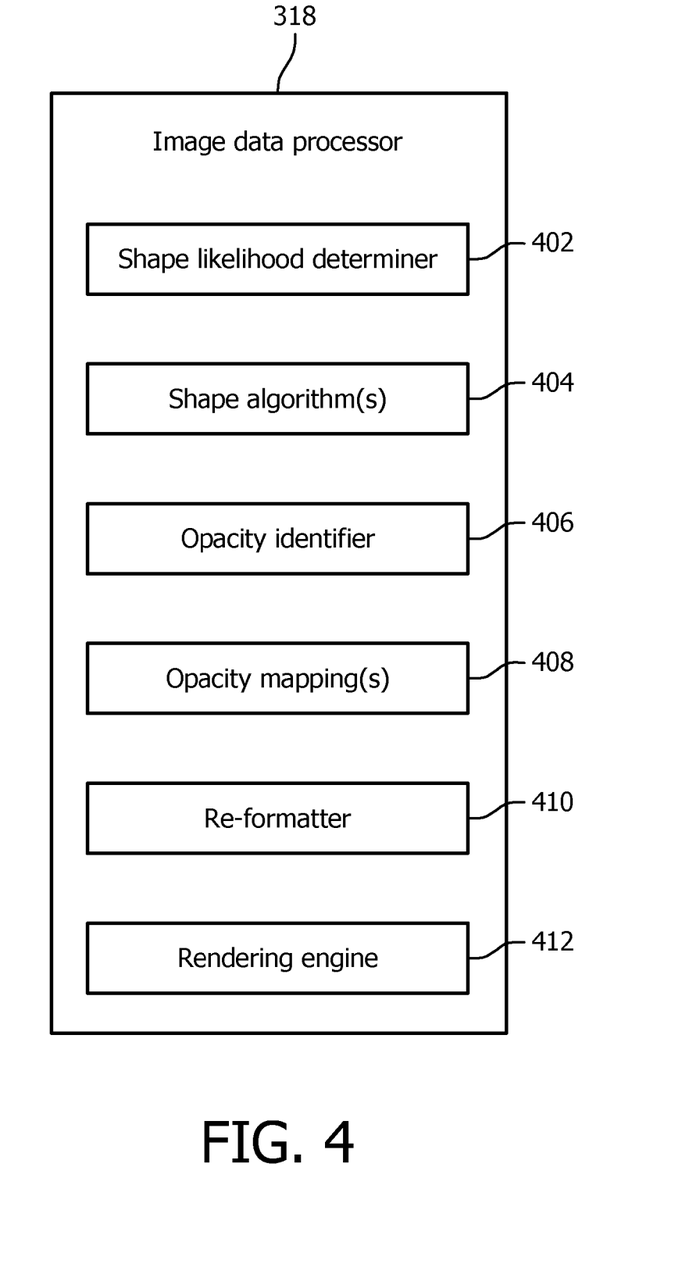
FIG. 4 schematically illustrates an example of the image data processor.

FIG. 4 schematically illustrates an example of the image data processor 318. In this example, the image data processor 318 visually suppresses an opacity of a voxel representing a particular tissue type based on a likelihood that the voxel is the particular tissue type, which is based on a shape of the particular tissue.

A shape likelihood determiner 402 determines, based on one or more shape algorithms 404, a likelihood that a voxel in the image data represents tissue having a particular shape. For example, a shape algorithm 404 may determine a likelihood that a voxel represents tubular shaped tissue as opposed to non-tubular shaped tissue such as blob shaped tissue. Such an algorithm may facilitate determining a likelihood that a voxel in lung study image data represents vasculature tissue in the lung, for example, as opposed to blob shaped nodule.

Examples of an algorithm for differentiating between tubular and blob shapes are discussed in Qiang Li, et al., "Selective enhancement filters for nodules, vessels, and airway walls in two- and three-dimensional CT scans," Med. Phys. Volume 30, 2003, pp. 2040-2051, Lorenz, et al., "Multi-scale line segmentation with automatic estimation of width, contrast and tangential direction in 2D and 3D medical images," First Joint Conference on Computer Vision, Virtual Reality and Robotics in Medicine, and Medical Robotics and Computer-Assisted Surgery, 1997, pp. 233-242, and Agam et al., "Vessel Tree Reconstruction in Thoracic CT Scans With Application to Nodule Detection, IEEE Transactions on Medical Imaging, Vol. 24, No. 4, APRIL 2005.

Other suitable algorithms include wide-spread algorithms based on Hessian eigenvalues, algorithms that employ multiple resolution scales, and/or other algorithms.

An opacity identifier 406 identifies a level of opacity suppression for each voxel based on one or more opacity mappings 408. For example, one mapping 408 may indicate that a voxel with a likelihood of zero (0) of representing tissue having the particular shape is not suppressed at all, a voxel with a likelihood of one (1) of representing tissue having the particular shape is fully suppressed such that it is not visible in the final image data, and a voxel with a likelihood between zero and one of representing tissue having the particular shape is partially suppressed, with the degree of suppression based on the likelihood.

In one instance, one of the one or more mappings 408 indicates that opacity suppression is linearly suppressed for likelihoods between zero and one. In this instance, a higher likelihood results in greater opacity suppression and a lower likelihood results in less opacity suppression. In another instance, another of the one or more mappings 408 indicates that opacity suppression is non-linearly suppressed such as quadratically, exponentially, etc. suppressed. Another one of the one or more mappings 408 may indicate that opacity suppression is flat or constant for one or more predetermined ranges of likelihoods and variable in one or more other predetermined ranges of likelihoods.

A re-formatter 410 re-formats the volumetric image data. For example, the data re-formatter 410 may re-format the volumetric image data and create a MIP, DVR, DRR, or other re-formatted data set. Opacity suppressed re-formatted volumetric image data can be generated by generating a likelihood image volume subjected to a monotonous transfer function. Then, the likelihood image volume subjected to a monotonous transfer function is subtracted from the original image intensities (densities), before computation of the re-formatted volumetric image data for each view ray.

A rendering engine 412 visually presents re-formatted image data. In one instance, the re-formatted image data is presented in a graphical user interface (GUI). For example, the GUI may include at least two display windows, with the volumetric image data presented in one of the display windows and re-formatted image data (opacity suppressed or non-opacity suppressed) displayed in another of the display windows. Where the re-formatted image data is displayed as a slab view, the slab may correspond to a default view and/or user selected region in the volumetric image data.

The GUI may include soft controls, for example, which allow a user to toggle between the opacity suppressed and the non-opacity suppressed re-formatted image data. This may include swapping data sets or changing the opacity transfer function and re-rendering the re-formatted image data. The soft controls may also include controls to select a particular one of the opacity mapping 408 to change the opacity suppression. The soft controls may also include controls to manually adjusting the opacity suppression transfer function.

Figure 5:
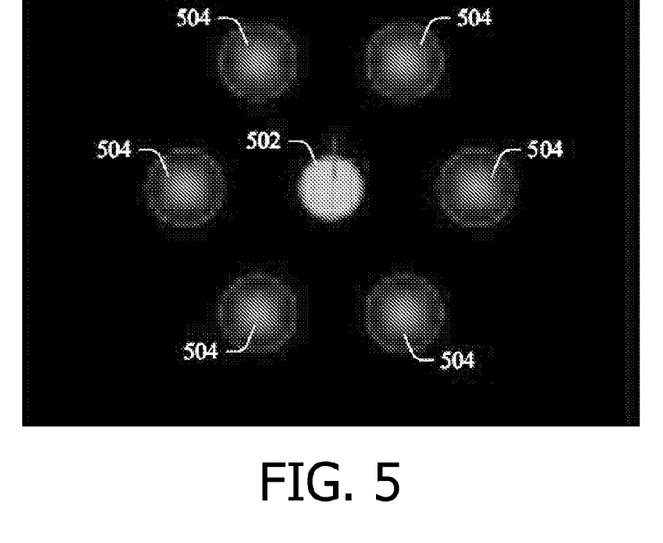
FIG. 5 shows an MIP image of a cross sectional view of simulated vessels and a nodule where the vessels are variably optical suppressed based on a likelihood that the voxels represent vessels.
Figure 6:
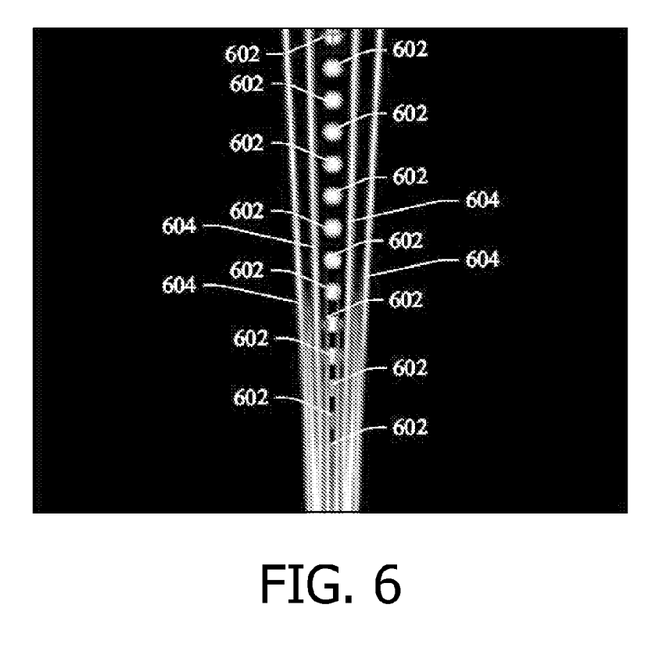
FIG. 6 shows an MIP image simulated vessels and nodules where the vessels are variably optical suppressed based on a likelihood that the voxels represent vessels.

FIGS. 5 and 6 show an example in which the opacity suppression described herein is applied to MIP re-formatted data set used to generate FIG. 1.

In FIG. 5, a simulated nodule 502 is substantially not opacity suppressed whereas simulated vessels 504, which surround the simulated nodule 502, are gradually visually opacity suppressed, with suppression increasing from a center of the vessels 504 to an outer periphery of the vessels 504, with a decrease in suppression at the outer periphery of the vessels 504. It is to be appreciated that the illustrated suppression is based on the shaper algorithm employed, and may be different then that shown in FIG. 5 for different shaper algorithms.

In FIG. 6, simulated nodules 602 are substantially not opacity suppressed whereas simulated vessels 604, which surround the simulated nodules 602, are gradually visually opacity suppressed, with suppression increasing from a center of the vessels 604 to an outer periphery of the vessels 604. Similar to FIG. 5, it is to be understood that the illustrated suppression is based on the shaper algorithm employed, and may be different then that shown in FIG. 6 for different shaper algorithms.

Figure 7:
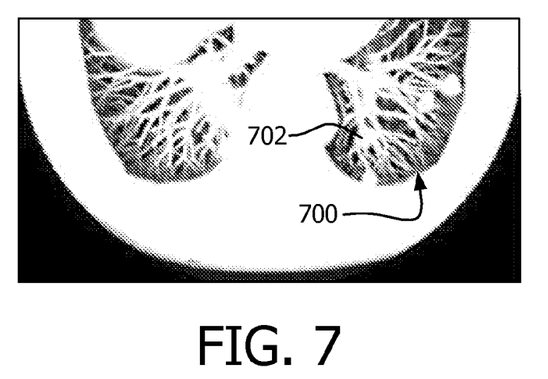
FIG. 7 shows a slab MIP image with no opacity suppression applied.
Figure 8:
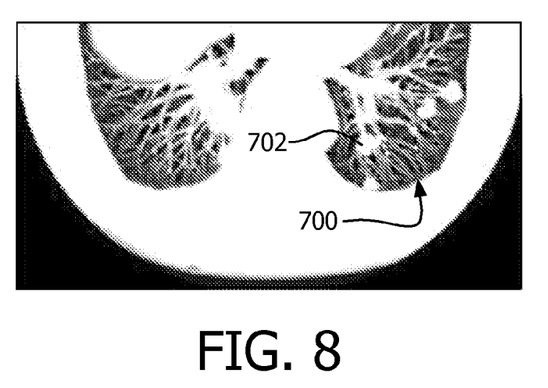
FIG. 8 shows the slab MIP image of FIG. 7 with 50% opacity suppression applied.
Figure 9:
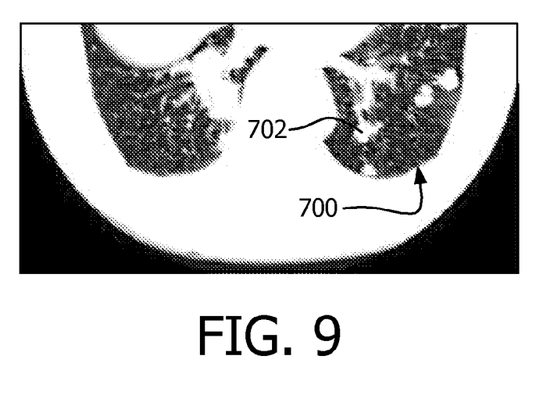
FIG. 9 shows the slab MIP image of FIG. 7 with 80% opacity suppression applied.

FIGS. 7, 8 and 9 show an example in which the opacity suppression described herein is applied to slab MIP re-formatted data sets. In FIG. 7 the user has set opacity suppression to zero, in FIG. 8 the user has set opacity suppression to 50%, and in FIG. 9 the user has set opacity suppression to 80%. As shown, neither vasculature 700 nor a nodule 702 is opacity suppressed in FIG. 7, the vasculature 700 is opacity suppressed and the nodule 702 is not opacity suppressed in FIG. 8, and the vasculature 700 is further opacity suppressed and the nodule 702 is not opacity suppressed in FIG. 9.

In one instance, the approach described herein can realized in a multi-scale scheme on different spatial resolution levels, using a resolution pyramid. For example, the image volume is taken at the highest resolution, and there decomposed into a vessel enhanced image, and its complement (the residual image). The residual image is subsampled to a lower resolution (e.g. using binomial, Gaussian, or spline subsampling). At this resolution level, the decomposition is repeated and so on. Then, on each level, the vessel-enhanced image is weakened with a linear or non-linear look-up function (which can be different for each resolution level). Finally the full image is recomposed (in reverse order of resolution levels). The modified vessel-enhanced image at the lowest level is re-composed with the residual image, the result is upsampled to the next higher level, re-composed, and so on.

Figure 10:
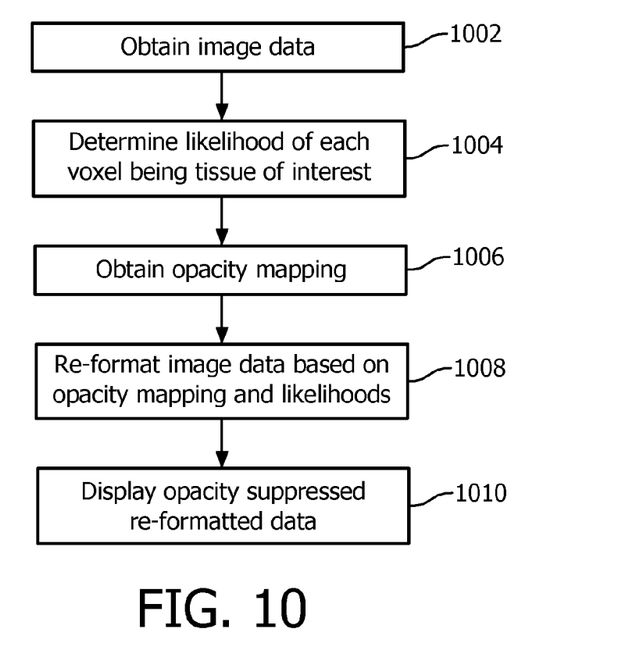
FIG. 10 illustrates an example method in which the intensity of voxels representing tissue of interest is suppressed based on a likelihood that the voxels represent the tissue of interest.

FIG. 10 illustrates an example method in which the intensity of voxels representing tissue of interest is suppressed based on a likelihood that the voxels represent the tissue of interest.

It is to be appreciated that the ordering of the acts is not limiting. As such, other orderings are contemplated herein. In addition, one or more acts may be omitted and/or one or more additional acts may be included.

At 1002, image data is obtained.

At 1004, a likelihood that each voxel represents predetermined tissue of interest is determined.

At 1006, an opacity mapping to the likelihoods is obtained

At 1008, the image data is re-formatted, based on the opacity mapping and the likelihoods, opacity suppressing the predetermined tissue of interest.

At 1010, the opacity suppressed re-formatted data is displayed.

Figure 11:
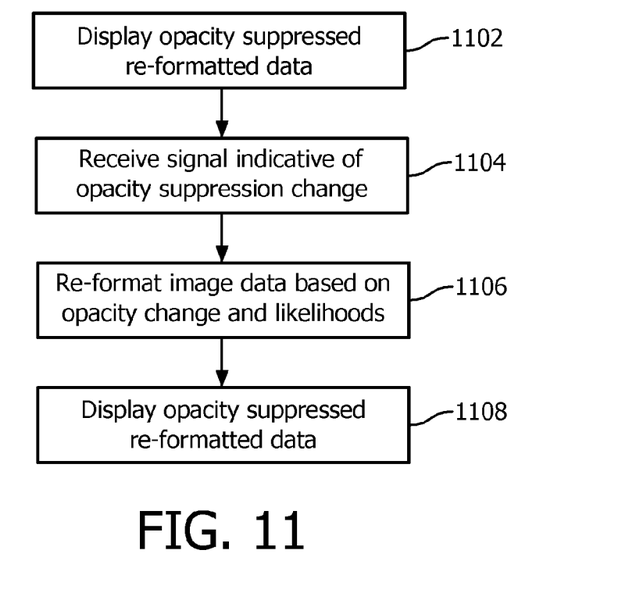
FIG. 11 illustrates an example method in which opacity suppression is varied.

FIG. 11 illustrates an example method in which opacity suppression is varied.

It is to be appreciated that the ordering of the acts is not limiting. As such, other orderings are contemplated herein. In addition, one or more acts may be omitted and/or one or more additional acts may be included.

At 1102, the opacity suppressed re-formatted image is displayed. The opacity suppressed re-formatted image can be generated as disclosed herein, for example, similar to FIG. 10, and/or otherwise.

At 1104, a signal indicative of a user change to the opacity suppression is received.

At 1106, image data used to generate the opacity suppressed re-formatted image is re-formatted based on the change in opacity suppression, as well as an opacity mapping and tissue likelihoods.

At 1108, the opacity suppressed re-formatted image is displayed.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

In one non-limiting instance, by opacity suppressing certain tissue as described herein, spherically shaped lumps such as nodules and lymph nodes may stand out more prominent because of less occlusion by vessels, underlying parenchyma tissue stands out more prominent because of less occlusion by vessels, vessel-subdued MIP is very similar to the standard MIP the radiologists are used to, images are not cluttered by distracting discrete markers, fully false negatives or positives are not produced because intensities are only gradually diminished but no voxels are completely suppressed based on any binary classification, interactive changing of the vessel weakening magnitude gives additional cues to the user which features appear and vanish, suggested novel rendering can be used on gray-value displays often used in radiology, intensity values of the potential anomalies (nodules, nodes) remain unchanged (only the normal structures are subdued), with a certain choice of vesselness filters, the subduing will leave the centerlines of larger vessels visible (thinning instead of full width subduing), thus allowing improved spatial orientation, etc.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An image data processor, comprising:
   a shape likelihood determiner comprising a processor configured to process voxels of image data and determine a likelihood that a voxel represents predetermined tissue of interest for a plurality of the voxels based on a shape of a tissue represented by the voxel, wherein the likelihood for the voxel is a value from zero to one;
   an opacity determiner comprising the processor, which is further configured to determine an opacity suppression for each of the plurality of voxels based on the likelihood;
   a re-formatter comprising the processor, which is further configured to re-format the image data based on the determined opacity suppression, generating opacity suppressed re-formatted data,
   wherein a voxel with a likelihood of zero of representing tissue having the shape is not suppressed, a voxel with a likelihood of one of representing tissue having the shape is fully suppressed such that it is not visible in the image data, and a voxel with a likelihood between zero and one is partially suppressed, with a degree of suppression based on the likelihood; and
   a rendering engine comprising the processor, which is further configured to visually presents the opacity suppressed re-formatted data,
   wherein the tissue of interest is not opacity suppressed in the visually presented re-formatted image data, and a second tissue other than the tissue of interest is gradually visually opacity suppressed with suppression increasing from a center of the second tissue to an outer periphery of the second tissue.

2. The image data processor of claim 1, wherein the tissue of interest is tubular shaped tissue.

3. The image data processor of claim 2, wherein the tubular shaped tissue includes one or more vessels.

4. The image data processor of claim 1, wherein opacity suppression linearly changes as a function of the likelihood.

5. The image data processor of claim 1, wherein opacity suppression non-linearly changes as a function of the likelihood.

6. The image data processor of claim 1, wherein opacity suppression is constant for a first likelihood range and variable, as a function of the likelihood, for a second different likelihood range.

7. The image data processor of claim 1, wherein the opacity determiner determines the opacity suppression for each of the plurality of voxels based on an opacity mapping, wherein the mapping corresponds to a signal indicative of a user selected mapping of interest.

8. The image data processor of claim 7, wherein the opacity determiner determines the opacity suppression for each of the plurality of voxels based on a change in the opacity mapping, and the re-formatter re-formats the image data based on the change in opacity suppression, generating second opacity suppressed re-formatted data.

9. The image data processor of claim 1, wherein the re-formatted data is one of a maximum intensity projection, a slab maximum intensity projection, a direct volume rendering, or a digitally reconstructed radiograph data.

10. The image data processor of claim 1, wherein the second tissue other than the tissue of interest is gradually visually opacity suppressed with suppression decreasing decrease at the outer periphery of the second tissue.

11. A method, comprising:
   determining a likelihood that each of a plurality of voxels of image data represents predetermined tissue of interest based on a shape of a tissue represented by the voxel, wherein the likelihood for the voxel is a value from zero to one;
   obtaining a likelihood to opacity mapping;
   re-formatting the image data based on the likelihood and the likelihood to opacity mapping, generating opacity suppressed formatted data, wherein a voxel with a likelihood of zero of representing tissue having the shape is not suppressed, a voxel with a likelihood of one of representing tissue not having the shape and is fully suppressed such that it is not visible in the image data, and a voxel with a likelihood between zero and one is partially suppressed, with a degree of suppression based on the likelihood; and
   displaying the opacity suppressed re-formatted data,
   wherein the tissue of interest is not opacity suppressed in the displayed re-formatted Image data, and a second different tissue is gradually visually opacity suppressed.

12. The method of claim 11, wherein the tissue of interest is tubular shaped tissue.

13. The method of any claim 11, wherein opacity suppression is proportional to the likelihood.

14. The method of claim 11, further comprising:
   receiving a signal indicative of a change in the opacity suppression;
   re-formatting the image data based on the signal, generating second opacity suppressed formatted data; and
   displaying the second opacity suppressed re-formatted data.

15. The method of claim 14, further comprising:
   toggling between displaying the opacity suppressed re-formatted image data and the second opacity suppressed re-formatted data.

16. The method of claim 11, further comprising:
   re-formatting the image data without opacity suppression, creating re-formatted image data; and
   toggling between displaying the re-formatted image data and the opacity suppressed re-formatted data.

17. The method of claim 11, wherein the image data has a first resolution, and further comprising; subsampling the voxels corresponding to the second different tissue to a second resolution, wherein the first resolution is greater than the second resolution.

18. The method of claim 11, wherein a first set of voxels corresponds to a same vessel in the image data, and opacity of at least two voxels of the first set of voxels is suppressed differently.

19. The method of claim 11, wherein the opacity suppression is manually adjusted.

20. A computer readable storage medium encoded with computer readable instructions, which, when executed by a processor, causes the processor to:
   determine a likelihood that each of a plurality of voxels of image data represents predetermined tissue of interest based on a shape of a tissue represented by the voxel, wherein the likelihood for the voxel is a value from zero to one, and at least one of the voxels has a likelihood between zero and one;
   obtain a likelihood to opacity mapping;
   re-format the image data based on the likelihood and the likelihood to opacity mapping, generating opacity suppressed formatted data, wherein a voxel with a likelihood of zero of representing tissue having the shape and is not suppressed, a voxel with a likelihood of one of representing tissue not having the shape and is fully suppressed such that it is not visible in the image data, and a voxel with a likelihood between zero and one is partially suppressed, with a degree of suppression based on the likelihood; and display the opacity suppressed re-formatted data, wherein the tissue of interest is not opacity suppressed in the displayed re-formatted image data, and a second tissue is gradually visually opacity suppressed with a decrease in the Suppression at the outer periphery of the second tissue.

* * * * *